Nov. 26, 1968   P. B. ZEIGLER ET AL   3,412,626
FOLDABLE ACTUATING LEVER

Filed Oct. 10, 1966   2 Sheets-Sheet 1

INVENTORS
Philip B. Zeigler &
BY Lawrence J. Mahalak
Charles R. White
ATTORNEY

Nov. 26, 1968   P. B. ZEIGLER ET AL   3,412,626
FOLDABLE ACTUATING LEVER
Filed Oct. 10, 1966                    2 Sheets-Sheet 2
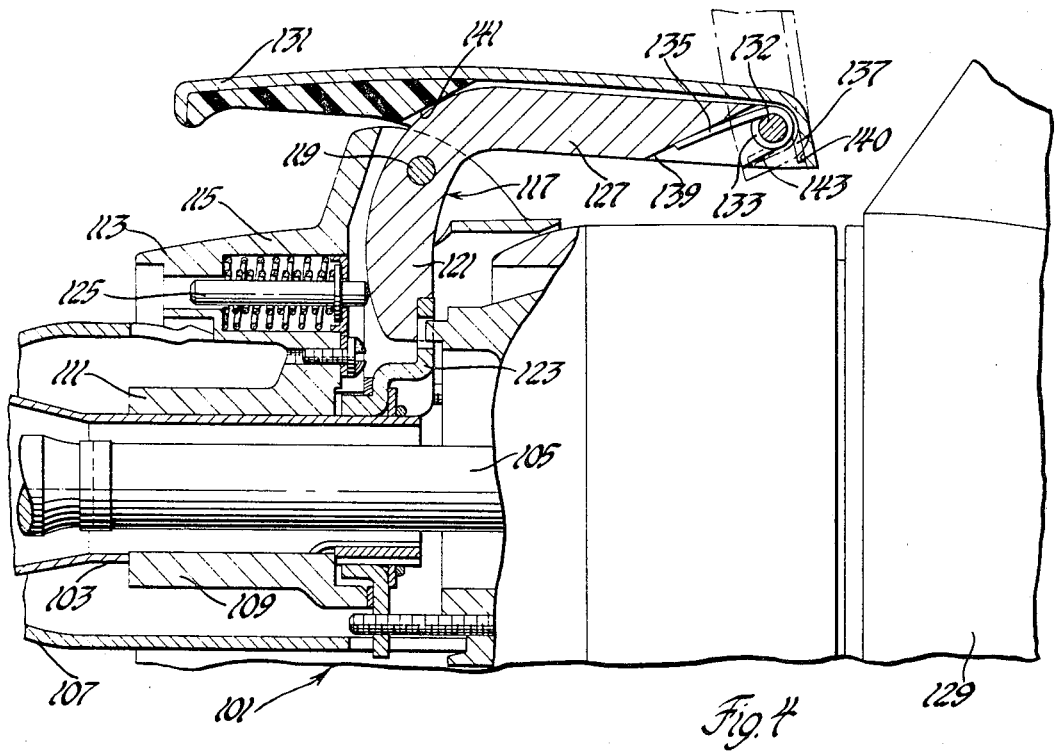
Fig. 4
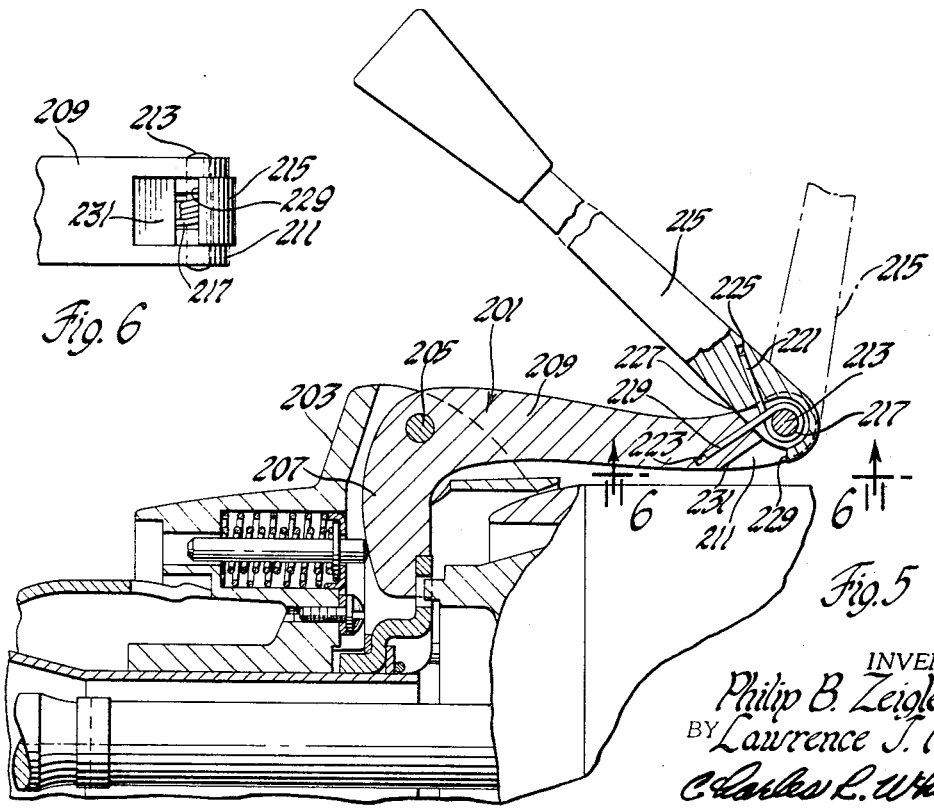
Fig. 6
Fig. 5
INVENTORS
Philip B. Zeigler &
BY Lawrence J. Mahalak
Charles R. White
ATTORNEY United States Patent Office 3,412,626
Patented Nov. 26, 1968

3,412,626
FOLDABLE ACTUATING LEVER
Philip B. Zeigler and Lawrence J. Mahalak, Saginaw, Mich., assignors to General Motors Corporation, Detroit, Mich., a corporation of Delaware
Filed Oct. 10, 1966, Ser. No. 585,506
13 Claims. (Cl. 74—473)

ABSTRACT OF THE DISCLOSURE

Transmission control including an actuating lever pivoted to a torque transmitting lever and biased by a spring mechanism to a stored or folded position adjacent to the torque transmitting lever. The actuating lever can be manually turned from the stored position to a predetermined operating position so that the actuating lever and the torque transmitting lever can be easily manipulated as a unit for transmission control.

---

This invention relates to a foldable, linkage-actuating lever and more particularly to a power transmission gear shift or selector lever normally biased to a folded position but readily movable therefrom to an extended position for subsequent transmission control linkage actuation.

In this invention as applied to vehicles, there is a transmission control lever pivotally connected to a torque transmitting lever which is operatively coupled with the shift tube or other transmission control linkage. This control lever is normally biased to an out-of-the-way, stored position alongside of the vehicle steering column but is located for convenient access by a vehicle operator so that the operator can efficiently locate and move the handle to an extended position angularly disposed to the steering column and adjacent to the lower side of the steering wheel for transmission control purposes. In this position the control lever and the torque transmitting lever are connected in a manner to allow manipulation of the shift tube by operation of the control lever. When the control lever is subsequently released by the operator it will be automatically returned to the folded position.

In one embodiment of the invention the control lever has a plurality of portions with one portion nested within the other. Structure is provided to couple the portions to each other and to connect the handle to a relay lever. A biasing spring device within the portions serves to uncouple the control lever from the relay lever and pivot it to a stored position upon release thereof by the operator. In another embodiment of the invention the control lever is a single member pivoted to a relay lever and is biased by a spring to a fully folded position but movable to an established fully extended position for transmission control purposes. Another embodiment of the invention also utilizes a single member normally biased to an intermediate, partially folded position and movable to a fully extended, preestablished operating position by application of appropriate operator force.

An object of this invention is to provide an operating lever for a linkage system in which the handle is normally biased to a folded position and manually movable to a preestablished, extended position for linkage system actuation.

Another object of this invention is to provide an operating lever for a linkage system biased from an extended operating position to an intermediate, preestablished folded position.

Another object of this invention is to provide a two-part operating lever including structure for rigidly coupling the lever and a torque transmitting member and further including a biasing device for release of the two parts from the torque transmitting structure and for return of the two-part lever to a folded position.

These and other objects of this invention will be apparent from the following description and claims taken in conjunction with the drawings in which:

FIGURE 4 is an elevational view, similar to that of FIGURE 1 but illustrating a second embodiment of the invention;

FIGURE 5 is a view similar to FIGURE 4 showing a third embodiment of the invention;

FIGURE 6 is a plan view taken along line 6—6 of FIGURE 5.

Figure 1:
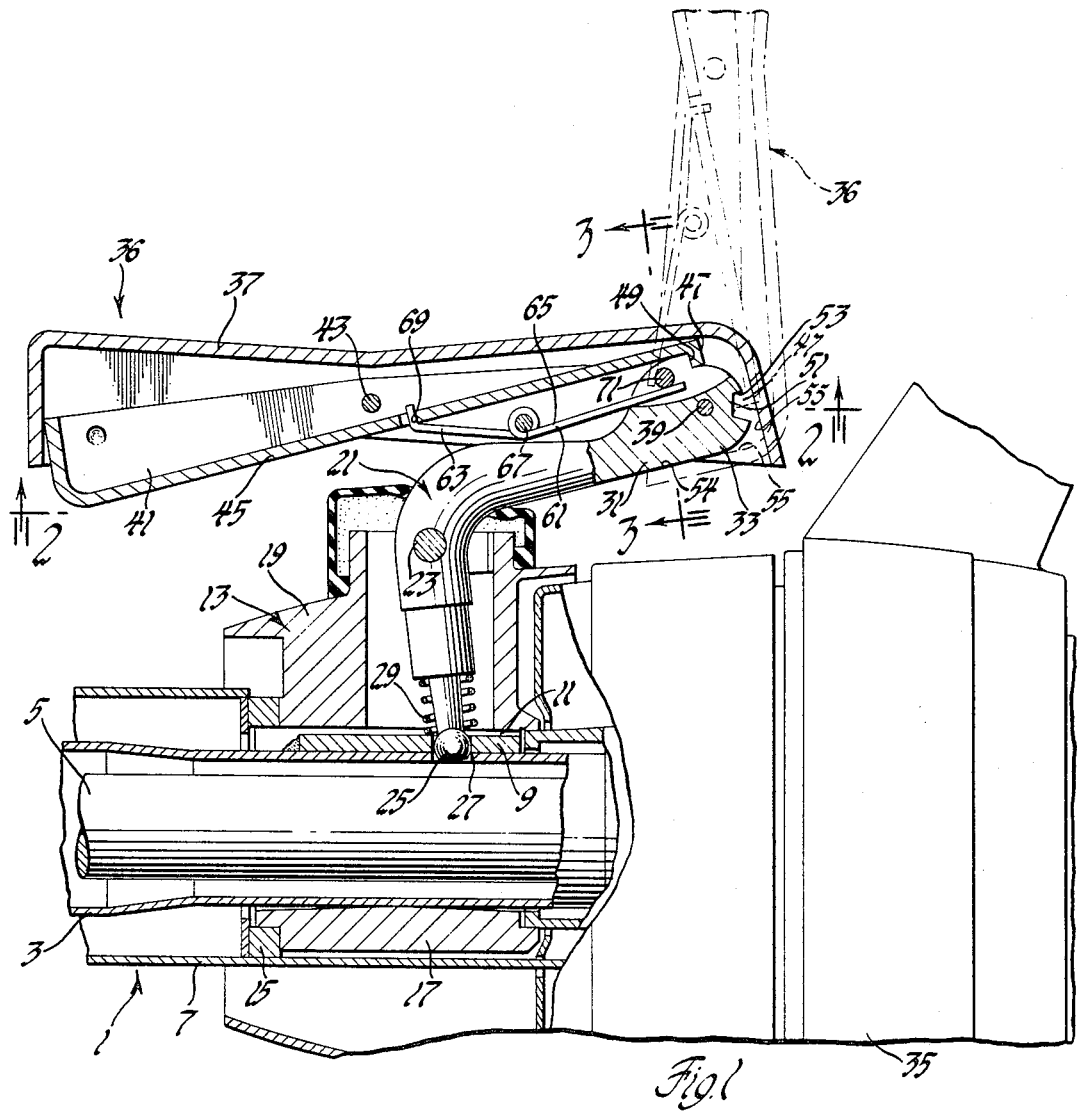
FIGURE 1 is an elevational view, principally in section, on a plane through the axis of a vehicle steering column assembly showing a portion of a transmission control mechanism for use with an automatic or manually shiftable transmission.

As shown in FIGURE 1, there is a vehicle steering column assembly 1 including a transmission control or shift tube 3 concentrically mounted between steering shaft 5 and mast jacket 7. The lower end of the shift tube is connected to a transmission in a suitable manner such as illustrated and described in U.S. Patent No. 2,924,988 to G. H. Primeau for transmission control purposes. The shift tube 3 has a key 9 secured to the upper end thereof which is slidable in a keyway 11 formed in a control lever housing 13 rotatably mounted on bearing 15 supported on the mast jacket.

The housing 13 includes a collar portion 17 which surrounds a portion of the shift tube 3 and includes a hollow, extended portion 19 in which relay lever 21 is supported by pivot pin 23. The relay lever is a generally right-angular member having a leg which projects into housing portion 19 and terminates in a ball 25 that fits within a circular opening 27 formed in key 9 and in the tube 3. An anti-rattle spring 29 is disposed between the key 9 and an offset shoulder formed on the relay lever. The other leg 31 of the lever 21 extends at a slight angle with respect to the mast jacket and terminates in an enlarged head portion 33 adjacent to the steering wheel 35 which is secured to the steering shaft 5 in a conventional manner.

A handle 36 is provided to manipulate the relay lever and the connected shift tube as will be described hereinafter. This handle includes an outer handle portion 37 secured at one end to the head portion of the relay lever by a pivot pin 39 and a nested inner handle portion 41 which is pivoted to the outer portion by a central pivot pin 43. The inner portion has an extending end 45 which terminates in an angularly extending catch 47. This catch is adapted to contact the shoulder 49 formed on the head portion of the relay lever to establish the folded position of the handle illustrated in full lines in FIGURE 1.

A notch 51 formed in the head portion 33 has a shoulder 53 which cooperates with catch 47 to allow the handle to be used to manipulate the relay lever and shift tube when the handle is in the extended position illustrated in phantom lines in FIGURE 1. This operating position is established by a stop 54 provided by contact between an inner wall 55 of the outer handle portion and the outer surface of the relay lever leg 31.

Figure 2:
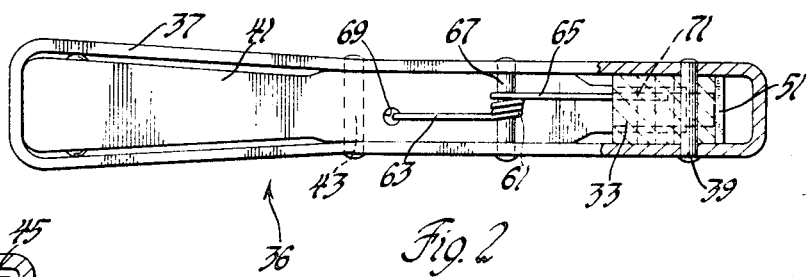
FIGURE 2 is a plan view taken along line 2—2 of FIGURE 1.
Figure 3:
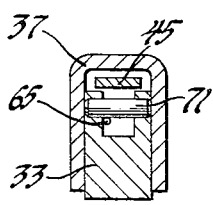
FIGURE 3 is a sectional view taken along line 3—3 of FIGURE 1.

To provide for automatic fold of the handle from the extended operating position to the full line, folded position, there is provided a spring 61 having a central coil and oppositely extending arms 63 and 65. The coil of this spring is mounted on a pin 67 supported by the outer handle portion 37 best shown in FIGURE 2. Arm 63 of this spring is hooked over at one end to extend within an opening 69 formed within the inner arm adjacent to the pivot 43 as illustrated. The end of the other spring arm 65 engages a pin 71 which extends between the bifurcated portions of the head 33 of the relay lever 21 as shown in FIGURES 1 and 3.

In viewing FIGURE 1 this spring tends to fold upwardly and, therefore, will exert a biasing force tending to turn handle portion 41 counterclockwise about pivot pin 43. The upper portion of catch 47 contacts an inner wall of handle portion 37 to reduce any tendency of these parts to rattle. It will be seen that the catch is not released due to the limited space available within the handle portion in the folded position and will remain engaged with the shoulder 49 until the handle is manually moved clockwise from the folded position.

The lever can be moved from the folded, full line position to the extended, phantom line position simply by the operator grasping the handle 36 as a unit and pivoting it about the pivot 39 until the catch drops in the notch and there is contact between the handle part and the lever at stop 54. In this latter position the handle and relay lever are connected to move the shift tube axially or rotationally. Operator force applied at the outer end of the handle portion 41 clockwise about pivot 43 overcomes the bias of spring 61 to maintain the catch in the notch 51.

To move the shift tube axially, the handle and connected relay lever are turned by the operator in either direction about pivot 23 and this turning motion is translated by the ball 25 to longitudinal, axial shifting motion of the tube 3. Lateral movement of the shift tube to the left is accomplished by turning handle 36 and the relay lever clockwise about pivot 23; lateral movement of the shift tube to the right in this figure is accomplished by turning handle 36 and lever 21 counterclockwise. Rotation of the shift tube is accomplished simply by moving the handle 36, the connected relay lever and housing 13 with respect to the axis of the drive shaft. This motion is translated by the keyway 11 via the key 9 to the attached shift tube. It will be appreciated that this shift tube movement can be utilized to effect transmission control over both automatic and manual shift transmission as pointed out in the above-identified prior patent.

To release the handle from the operating position illustrated, the operator merely releases the handle 36 from his grasp. The inner handle portion 41 will then pivot counterclockwise around the pivot 43 due to the bias of spring 61 to release the catch 47 from the notch 51. The spring will then provide a counterclockwise moment on the handle to force the handle back to the folded position illustrated. When the catch 47 again engages the shoulder 49, there can be no further downward movement and the handle will be in its folded position.

The second embodiment of the invention is illustrated in FIGURE 4 in which the vehicle steering column assembly 101 includes a transmission control or shift tube 103 concentrically mounted between the steering shaft 105 and mast jacket 107. The shift tube 103 has a slot formed therein which receives a projection or key 109 formed on a collar portion 111 of a rotatable control lever housing 113. The housing 113 includes a hollow portion 115, extending from the collar, in which the relay lever 117 is mounted by pivot pin 119. The relay lever is a generally right-angular member having a leg 121 which projects into the housing portion 115. An end portion of this leg is engaged in a slot, not shown, formed in a stationary plate 123 to prevent rotation of the housing and tube relative to the fixed plate. Spring biased plunger 125 mounted in housing 113 bears against the outer surface of leg 121 to maintain this engagement. The other leg 127 of the lever extends in a direction parallel with respect to the mast jacket 107 and toward the steering wheel 129.

A lever or handle 131 is provided to manipulate the relay lever and the connected shift tube as will be described below. This handle is generally U-shaped in cross section and fits over lever leg 127 when in the folded position. As shown, the handle is pivoted at one end to one end of the lever leg by a pivot 132. A spring 133 having a central coil portion is mounted on pin 132 in bifurcated end portion of leg 127. This spring has oppositely extending arm portions 135 and 137 which tend to deflect upwardly in viewing FIGURE 4. Spring arm 135 contacts the slanted shoulder 139 formed on lever leg 127 while arm 137 contacts an inner portion 140 of handle 131. The spring thus normally biases the handle 131 into the folded position illustrated so that stop 141 is engaged by the outer portion of the relay lever 117. The handle can be easily grasped by the operator and moved against the bias of the spring until the end portion 143 of the bifurcated end of lever leg 127 is contacted by a portion 140 of the handle 131. This operating position is illustrated in phantom lines in FIGURE 4.

When in this position, it will be appreciated that the handle and the relay lever will be connected; the relay lever can be rocked for disengagement from stop plate 123. The handle, the relay lever, the housing 113 and the shift tube can be rotated in either direction to effect transmission control. Upon release of the handle 131 by the vehicle operator, the handle will return to its folded position illustrated in FIGURE 4.

The third embodiment of the invention is shown in FIGURES 5 and 6. With the exception of the relay lever and control handle the remaining structure is the same as that described in connection with FIGURE 4 and the structure common to the two embodiments will not be further described in detail.

This third embodiment includes a relay lever 201 pivoted to the lever housing 203 by a pivot pin 205. The relay lever has angularly disposed legs 207 and 209. As best shown in FIGURE 6, the leg 209 has a bifurcated end 211 and carries a pivot pin 213 which rotatably supports one end of control lever 215. A spring 217 has a central coil mounted on the pin 213 and oppositely extending end portions 219 and 221 which are respectively mounted in slot 223 of lever 215 and slot 225 of lever leg 209. The spring tends to close and biases lever 215 to an intermediate, folded position in which this lever contacts leg 209 at 227. The lever 215 can be moved by the operator until stop 229 engages the slanted wall 231 that establishes the lever operating position illustrated in phantom lines in FIGURE 5.

Manipulation of the shift tube of this embodiment by the lever is the same as that described in connection with FIGURE 4.

From the above it will be appreciated that Applicants have provided an advanced lever design which provides more space in that the lever is retained in a folded, out-of-the-way position.

It will be further appreciated that the above embodiments are illustrative of only certain forms of the invention and that others fall within the claims which set forth the limits of the invention.

We claim:

1. In a transmission control, an actuating lever, a torque transmitting lever, means pivotally connecting said actuating lever to said torque transmitting lever for movement between an operating position in which said actuating lever projects at a predetermined angle with respect to said torque transmitting lever and a folded position in which said actuating lever is adjacent to said operating lever, support means rotatably mounting said torque transmitting lever for limited rotation with respect to different rotational axes, biasing means operatively connected to said actuating lever for moving said actuating lever from said operating position to said folded position, and said actuating lever being movable from said folded position to said operating position in response to a directed force applied to said actuating lever which is sufficient to overcome the opposing force of said biasing means.

2. The transmission control of claim 1 and including a vehicle steering column and a steering wheel mounted at one end thereof, said actuating lever being movable between a stored position alongside of said column to an operating position adjacent the lower side of said steering wheel.

3. The control defined in claim 1 wherein said actuating lever includes a single handle member, said handle member being automatically foldable to a nested position on a portion of said torque transmitting lever from said operating position by action of said biasing means.

4. The control defined in claim 1 wherein said actuating lever is a two-part handle, said parts being pivoted to each other, and one of said parts being connected to said torque transmitting lever by said first mentioned means.

5. The control defined in claim 14 wherein said actuating lever is a unitary handle member, said handle member and said torque transmitting lever having cooperating stop means to establish said folded position of said handle member at a predetermined station between said operating position and said torque transmitting lever.

6. A transmission control comprising an actuating lever, a torque transmitting lever, pivot means for connecting said levers to each other for movement between a folded position in which said actuating lever is adjacent to said torque transmitting lever and an operating position in which said actuating lever extends outwardly from and at a predetermined angle with respect to said torque transmitting lever, support means for mounting said torque transmitting lever for limited rotation with respect to an axis of rotation, yieldable means operatively connected to said actuating lever and exerting a force thereon for moving said actuating lever from said operating position to said folded position, and limiting means formed by an extended porton of said actuating lever for establishing said operating position subsequent to the application of a force turning said actuating lever on said pivot means against the force of said yieldable means.

7. The control defined in claim 6 wherein said actuator lever is a two-part handle, means pivotally mounting the parts of said handle to each other, a catch member formed on the end of one of said parts, stop means on said torque transmitting lever engageable by said catch member in the folded position of said actuator lever and additional stop means engageable by said catch means when said actuator lever is in the extended position, said yieldable means being a spring for biasing said catch means from said additional stop means and for biasing said actuator lever from the extended position to the folded position.

8. The control defined in claim 6 and further including another stop means between one of said handle parts and said actuator lever, said last mentioned stop means cooperating with said additional stop means to securely connect said actuator lever to said torque transmitting lever and permit said levers to be rotated as a unit.

9. In combination, a first member, a second member pivotally mounted on said first member, a third member pivotally mounted on said second member, engageable first means for connecting said third member to said first member to limit rotation of said second member relative to said first member in one direction, means for limiting rotation of said second member relative to said first member in an opposite direction simultaneously with the engagement of said first recited means, said former and latter means permitting said first member to be moved by actuation of said second and third members, and means operative on said first recited means for disconnecting said third member from said first member and turning said second and third members relative to said first member.

10. The combination of claim 9 wherein said engageable first means is a detent member carried by said third member and wherein said second recited means is provided by a stop between said first and third members and said third recited means being a spring member for biasing said third member relative to said second member about the pivot connecting said second and third members, said spring member being subsequently operative to bias said second and third members as a unit relative to said first member about the pivot connecting said first and second member.

11. A control mechanism comprising, in combination, a support column, a control member movably supported in said column for rotary and reciprocal movement relative to said column, lever means for rotating and axially moving said control member, a housing pivotally supporting said lever means, means mounting said housing on said column for rotary movement with respect thereto, means coupling said housing to said lever means, said lever means having a handle portion and a relay lever portion, said relay lever portion being pivoted to said housing, said handle portion being pivoted near one end to said relay lever portion.

12. The control defined in claim 11 and further including spring means for biasing said handle portion to a position adjacent said relay lever portion, manually operative detent means for holding said handle portion in an adjusted position on said relay lever portion, said spring means being operative to disengage said detent and release said handle portion to thereby allow said handle portion to return to the adjacent position.

13. The control defined in claim 12 wherein said handle portion is movable relative to said relay lever portion upon application of sufficient force to overcome the retarding action of said spring to a maximum position with respect to said leg portion, stop means on said handle portion for limiting the movement of said handle portion with respect to said lever portion and establishing the maximum position.

References Cited
UNITED STATES PATENTS

| | | | |
|---|---|---|---|
| 1,743,241 | 1/1930 | Schmidt | 74—473 |
| 2,169,034 | 8/1939 | Vanderveld | 74—473 |

FRED C. MATTERN, JR., *Primary Examiner.*

B. T. CALLAHAN, *Assistant Examiner.*

UNITED STATES PATENT OFFICE
CERTIFICATE OF CORRECTION

Patent No. 3,412,626                                                           November 26, 1968

Philip B. Zeigler et al

It is certified that error appears in the above identified patent and that said Letters Patent are hereby corrected as shown below:

Column 5, line 16, the claim reference numeral "14" should read -- 1 --.

Signed and sealed this 24th day of March 1970.

(SEAL)
Attest:

Edward M. Fletcher, Jr.                               WILLIAM E. SCHUYLER, JR.
Attesting Officer                                                  Commissioner of Patents